(12) United States Patent
Meuter et al.

(10) Patent No.: US 10,270,981 B2
(45) Date of Patent: Apr. 23, 2019

(54) METHOD FOR PROCESSING HIGH DYNAMIC RANGE (HDR) DATA FROM A NONLINEAR CAMERA

(71) Applicant: Aptiv Technologies Limited, St. Michael (BB)

(72) Inventors: Mirko Meuter, Erkrath (DE); Mateusz Komorkiewicz, Krakow (PL); Rajat Sanyal, Wuppertal (DE); Christof Petig, Wuppertal (DE)

(73) Assignee: Aptiv Technologies Limited (BB)

( * ) Notice: Subject to any disclaimer, the term of this patent is extended or adjusted under 35 U.S.C. 154(b) by 85 days.

(21) Appl. No.: 15/441,893

(22) Filed: Feb. 24, 2017

(65) Prior Publication Data
US 2017/0257551 A1   Sep. 7, 2017

(30) Foreign Application Priority Data

Mar. 4, 2016   (EP) .................................... 16158766

(51) Int. Cl.
*H04N 19/426*   (2014.01)
*H04N 5/235*   (2006.01)
(Continued)

(52) U.S. Cl.
CPC ........... *H04N 5/2355* (2013.01); *B60R 11/04* (2013.01); *G06K 9/00791* (2013.01);
(Continued)

(58) Field of Classification Search
CPC .............................. H04N 19/428; H04N 9/04
See application file for complete search history.

(56) References Cited

U.S. PATENT DOCUMENTS

2005/0179775 A1* 8/2005 Rodriguez ........... H04N 1/6027
348/97
2008/0030603 A1* 2/2008 Masuno ................ H04N 9/045
348/273
(Continued)

FOREIGN PATENT DOCUMENTS

JP      200724998     12/2007
WO   2004/034183 A2    4/2004
WO   2014/025588 A1    2/2014

OTHER PUBLICATIONS

Jari Loytomaki, et al.: "HDR Cameras Linear and non-linear", May 31, 2014 (May 31, 2014), XP055269611, Retrieved from the Internet: URL:http://www.stemmer-imaging.de/media/uploads/jia/SI/SISE-2015_1_1-JAI-How-to-get-high-dynamic-range-images-using-different-techniques.pdf pp. 22-26.
(Continued)

*Primary Examiner* — Jayanti K Patel
*Assistant Examiner* — Shadan E Haghani
(74) *Attorney, Agent, or Firm* — Lawrence D. Hazelton (57) ABSTRACT

A method for processing high dynamic range data from a nonlinear camera includes; generating an input image comprising a plurality of pixels, each pixel having an initial pixel value, wherein the initial pixel values are generated using a camera transition curve; generating a first lookup table representing a combination of an inverse function and a re-compression function, the first lookup table having input values and output values, wherein each input value is linked to one output value, the inverse function is the inverse of the camera transition curve, the re-compression function is a smooth and continuous function having a slope at each input value which is greater than or equal to a corresponding slope of the camera transition curve, the first lookup table is generated such that the inverse function precedes the re-
(Continued)

compression function; and generating a first image by converting the initial pixel values using the first lookup table.

13 Claims, 3 Drawing Sheets

(51) Int. Cl.
*G06T 7/11* (2017.01)
*B60R 11/04* (2006.01)
*G06K 9/00* (2006.01)
*H04N 9/04* (2006.01)
*H04N 9/73* (2006.01)
*G06T 5/00* (2006.01)

(52) U.S. Cl.
CPC ............... *G06T 5/009* (2013.01); *G06T 7/11* (2017.01); *H04N 9/04* (2013.01); *H04N 9/735* (2013.01); *H04N 19/428* (2014.11); *B60R 2300/10* (2013.01); *B60R 2300/30* (2013.01); *G06T 2207/20208* (2013.01)

(56) References Cited

U.S. PATENT DOCUMENTS

| | | | | |
|---|---|---|---|---|
| 2008/0075364 A1* | 3/2008 | Speigle | ............... | H04N 1/60 382/167 |
| 2011/0123133 A1* | 5/2011 | Mohanty | ............... | G06T 5/009 382/274 |
| 2014/0002479 A1* | 1/2014 | Muijs | ............... | G06T 5/50 345/589 |
| 2016/0014421 A1* | 1/2016 | Cote | ............... | H04N 19/196 382/170 |
| 2016/0165256 A1* | 6/2016 | Van Der Vleuten | ..... | H04N 9/68 375/240.01 |
| 2016/0316153 A1* | 10/2016 | Grauer | ............... | H01L 27/14621 |
| 2017/0178292 A1* | 6/2017 | Jiang | ............... | G06T 3/4015 |

OTHER PUBLICATIONS

Pribyl Bronislav, et al.: "Evaluation of feature point detection in high dynamic range imagery", Journal of Visual Communication and Image Representation, Academic Press, Inc, US, vol. 38, Feb. 24, 2016 (Feb. 24, 2016), pp. 141-160, XP029540780, ISSN: 1047-3203, DOI: 10.1016/J.JVCIR.2016.02.007. p. 143, col. 2, line 1-p. 145, col. 1, line 6.

Cliff De Locht and Hans Van Den Broeck: "Complementary metal-oxide-semiconductor (CMOS) image sensors for automotive applications"; "Chapter 8" In: Multiple authors (editor: D. Durini): May 12, 2014 (May 12, 2014), Woodhead Publishing, XP009191091, ISBN: 978-0-85709-598-5 pp. 235-249, DOI: 10.1533/9780857097521. 2.235, p. 241-p. 245.

* cited by examiner

METHOD FOR PROCESSING HIGH DYNAMIC RANGE (HDR) DATA FROM A NONLINEAR CAMERA

CROSS-REFERENCE TO RELATED APPLICATION

This application claims the benefit under 35 U.S.C. § 119(a) of European Patent Application EP 16158766.2, filed 4 Mar. 2016, the entire disclosure of which is hereby incorporated herein by reference.

TECHNICAL FIELD OF INVENTION

This disclosure generally relates to a method for processing High Dynamic Range (HDR) data from a non-linear camera.

BACKGROUND OF INVENTION

Processing data of HDR cameras is required in a variety of technical fields. Particularly, in automotive applications HDR cameras are used to provide images of a driving path in order to enable e.g. obstacle detection, traffic sign recognition, or lane recognition. The cameras used in automotive applications can e.g. cover a wide dynamic range of up to 120 dB. This dynamic range can be achieved by using multiple exposures followed by a fusion on the imager chip.

Usually, the image data generated by a camera corresponds to the camera behavior which can be described by a piecewise linear transition curve with multiple slopes and/or knee points.

The camera image can be companded before being outputted from the camera. The image thus outputted/generated by the camera can consume 12-14 bits per pixel, wherein the corresponding original linear HDR data would even cover a data range of more than 16 and up to 32 bits per pixel.

Automotive applications typically require a fast image processing without the use of high-end components. However, working with images having 16 or 32 bits per pixel can be time consuming and requires a lot of memory bandwidth and processing power.

SUMMARY OF THE INVENTION

Therefore, it is the object of the present invention to provide a method and a system for processing high dynamic range data from a nonlinear camera that reduce the required processing power and memory bandwidth and yield—at the same time—image data that can be used for further applications.

This object is satisfied by a method and a camera system. The invention further relates to a vehicle.

The method includes: generating an input image with the camera, the input image comprising a plurality of pixels, each pixel having an initial pixel value, wherein the initial pixel values are generated using a camera transition curve; generating a first lookup table representing a combination of an inverse function and a re-compression function, the first lookup table having input values and output values, wherein each input value is linked to one, preferably to exactly one, output value, the inverse function is the inverse of the camera transition curve, the re-compression function is preferably a smooth and continuous function preferably having a slope at each input value which is greater than (or equal to) a corresponding slope of the camera transition curve, and wherein the first lookup table is generated such that the inverse function precedes the re-compression function; and generating a first image by converting the initial pixel values using the first lookup table.

According to the invention, a first lookup table is generated, wherein the first lookup table can be a representation of the inverse function and the re-compression function, i.e. the input values of the first lookup table correspond to input values that are initially processed by the inverse function and then by the re-compression function, whereas the output values of the first lookup table correspond to the values the inverse function followed by the re-compression function would generate for a corresponding input value.

The camera can be a nonlinear camera which produces input images based on multiple exposures. The camera transition curve can be a function that is not smooth and/or continuous. The camera transition curve can be a piecewise linear transition curve with multiple slopes and/or knee points.

The inverse function corresponds to the inverse of the camera transition curve. The inverse function can recover a linear relationship between luminance (in a scene captured by the camera) and image brightness. The inverse function can expand the pixel depth of the input image. For example, the inverse function can generate data having 20 bits per pixel from an input image having 12 bits per pixel. After the inverse function has expanded the pixel depth to 20 bits, the re-compression function can reduce (i.e. re-compress) the pixel depth to 15 bits. Thus, the function executed by the first lookup table can be a combination of a linearization and a re-compression.

In other words, the first lookup table can represent output values that correspond to input values which have been computed firstly with the inverse function and secondly with the re-compression function. Hereby, the result of the inverse function is fed into the recompression-function. As the first lookup table can reflect both functions, a calculation of both functions is substituted with the mapping in accordance with the first lookup table. The output values of the first lookup table can cover 15 bit, i.e. more bits than the input values.

Since the inverse function and the re-compression function are represented by the first lookup table, the generation of the first image from the input image can be performed using only the first lookup table. The usage of the first lookup table requires significantly less processing power and memory bandwidth than the usage of a "normal" inverse function and a "normal" re-compression function, as the values of the input image only have to be mapped to the output values in accordance with the first lookup table. In other words, the first lookup table maps initial pixel values to the pixel values of the first image. Thus, the method of the invention can be executed faster and/or on less powerful devices.

As an example, the input image can have 1.3 million pixels, each having a 12 bit pixel value. Since the first lookup table only needs to map 12 bit, i.e. 4096 values, these 4096 values only have to be calculated once and can then be used for all 1.3 million pixels (and for following images). Thereby a great reduction of the necessary calculations can be accomplished and the speed of processing one or multiple input images can be increased.

Due to the linearization and the re-compression, the method of the invention provides image data which is less prone to processing artifacts. Thereby a disadvantage, namely that camera transition curves coming from multiple exposures can have strong slope discontinuities which can lead to artifacts, if the data is processed within subsequent processing steps, is removed. Thus, the image data is ideally suited for further applications, e.g. machine vision applications. At the same time, using a lookup table allows to perform the required transformation using minimal computational requirements.

The re-compression function is a smooth and continuous function and, hence, has no discontinuities or knee points (i.e. "jumps" in slope). The slope (d/dx) of the re-compression function is chosen such that its slope is greater than a corresponding slope of the camera transition curve, wherein this condition is preferably met for every possible initial pixel value. The restricting condition for the slope of the re-compression function assures that each input value of the first lookup table is linked to one output value, only. It therefore is not possible that two different input values are linked to the same output value. The re-compression function thereby achieves a lossless transformation of values outputted by the inverse function. Furthermore, due to its continuous nature, the re-compression function avoids artifacts.

The first image is an intermediate result that can be outputted and/or made available for further processing, particularly for the use in automotive machine vision applications.

According to an embodiment, the re-compression function comprises a logarithmic compression function, preferably the function $$y=a*ld(x)+b \qquad \text{Eq. 1,}$$

wherein a and b are selected in such a way that $$\frac{d}{dx}a*ld(x)+b >= \frac{d}{dx}\text{camera\_transition\_curve}(x), \qquad \text{Eq. 2}$$

wherein a and b are coefficients, x is an initial pixel value and y is an output value.

The values of a and b are preferably selected such that the re-compression has a slope at each input value which is greater than or equal to a corresponding slope of the camera transition curve.

Generally, x can be an input value and y can be a function value or output value. Herein, all defined variables (except x and y which are always the respective input or output values) are consistent over all disclosed functions/formulas.

Using a logarithmic function bears the advantage that further calculations e.g. on the first image can be based on additions and subtractions rather than on multiplications and divisions. Thereby, the requirements on processing power can be further reduced.

According to a further embodiment, the re-compression function performs a lossless transformation. Preferably, the input image consumes fewer bits per pixel than the first image. However, the first image can have fewer bits per pixel than an uncompressed linear brightness representation of the input image. As an example, the input image can require 12 bits per pixel, the uncompressed linear values (on which the input image can be based) or a result of the inverse function can use 20 bits per pixel, whereas the first image can have 15 bits per pixel.

In a further embodiment the first lookup table also represents a clipping function which maps all input values below or equal to 1 or all input values below or equal to a predefined threshold value to a value of 0. The clipping function can precede the inverse function. Thus, the first lookup table can comprise or represent the clipping function, the inverse function, and the re-compression function. In other words, before the inverse function is executed, all initial pixel values e.g. below or equal to 1 are mapped to a value of 0. Preferably, initial pixel values greater than 1 are not changed by the clipping function. The clipping function can also be used to eliminate values generated due to dark currents of a camera sensor. Thus, the clipping function can achieve a dark current or dark frame subtraction.

In consequence, the first lookup table can represent output values that correspond to input values which have been processed firstly by the clipping function, secondly by the inverse function and thirdly by the re-compression function. Hereby, the result of the clipping function is fed into the inverse function and the result of the inverse function is fed into the re-compression function. As the first lookup table can reflect all three functions, a calculation of all three functions can be substituted by the mapping in accordance with the first lookup table.

In accordance with a further embodiment an initial histogram of the input image is calculated and the initial histogram is transformed into a modified histogram using the first lookup table. The initial histogram can be a histogram that is supplied by the camera and/or is calculated based on the input image.

When the values of the initial histogram are mapped to the modified histogram using the first lookup table, the values of the bins of the initial histogram can be modified using the first lookup table. The corresponding count for a specific bin preferably is not changed. However, a count for a specific bin can be changed, if it is required that one bin covers multiple grey values Generally, a histogram is an estimate of the probability distribution of a particular type of data. An image histogram (i.e., all histograms described herein) is a type of histogram which offers a representation of the tonal distribution of the grey values in a digital image. For an 8-bit greyscale image there are 256 different possible intensities, and so the histogram can have 256 bins to show the distribution amongst those greyscale values.

In accordance with a further embodiment the initial histogram is calculated as a weighted sum of sub-histograms of several regions of the input image, wherein each sub-histogram is preferably given equal weight. The sub-histograms can be computed as histograms over regions of the input image. Preferably, the sub-histograms cover an expected driving path of a vehicle in different distances. The sub-histograms can be combined as a weighted sum into the initial histogram, wherein also a full-resolution histogram of the input image can be included in the weighted sum.

In a further embodiment, at least one of these histograms (e.g. one of the sub-histograms) can be taken directly as additional output of the camera.

The histograms of the expected driving path can be based on regions that are the smaller the further away from the vehicle the region corresponding to an area of the driving path is.

In the initial histogram, all sub-histograms can get equal weight even if the sub-histograms are computed on smaller regions of the input image.

Alternatively, the sub-histograms are weighted with the inverse of their corresponding area of the input image. Thus, smaller regions can have a higher weight.

The usage of equal weights avoids e.g. that tunnel entries are mapped to too few grey levels. As an advantage, the initial histogram can be used to compute a global tone mapping operator which is specifically tailored to automotive applications and/or high contrast images.

In a further embodiment the modified histogram is transformed to a reduced histogram comprising of fewer bins than the modified histogram and advantageously a second lookup table is generated, which represents a modified histogram equalization based on the reduced histogram. Preferably, the reduced histogram comprises of 64 or 256 bins. The reduction to 64 or 256 bins allows faster computing as fewer values have to be calculated.

Generally, histogram equalization is an image modification technique. By using histogram equalization, the grey levels of an image are re-mapped such that an even distribution of the grey levels to the bins is achieved.

A histogram equalization can be based on a cumulative histogram. In a cumulative histogram each bin contains the sum of itself and all previous bins. However, a standard histogram equalization can have disadvantages: If one bin contains a high value count, this can lead to gaps after requantisation, meaning that some grey values that could be used to store information are not used in practice and a histogram over the output values would contain unused bits. Furthermore, if there is a low count for multiple subsequent bins, the histogram equalization can combine too many input bins into one output bin. Thus, an information loss could occur while it is desired to maximize the information content of the requantisised output.

Therefore, a modified histogram equalization can be used herein. For the modified histogram equalization, bin counts of the modified histogram are altered such that all bin counts are between (or equal to) a predefined maximum value and a predefined minimum value. Bin counts of the modified histogram above the maximum value can be set to the maximum value. Correspondingly, bin counts of the modified histogram below the minimum value are set to the minimum value. Thereby, gaps in the output quantisation or a combination of multiple grey values into one output value can be prevented.

After the alteration of the bin counts of the modified histogram, a convolution of the modified histogram with a low-pass filter, e.g. by convolving the modified histogram with a Gaussian function, can be executed. The convolution can create a smoother modified histogram. The convolution and/or the alteration of the bin counts can be iterated for a predefined number of times.

After the convolution, the reduced histogram is generated as a cumulative histogram from the modified histogram, wherein the reduced histogram comprises of fewer bins than the modified histogram and wherein a (now modified) histogram equalization using the reduced histogram is mapped in the second lookup table. That is, the reduced histogram is the cumulative histogram. Several bins of the modified histogram can be mapped to one bin of the reduced histogram. Due to the convolution with the low-pass filter, the second lookup table represents a smooth transition curve.

The transition curve of the second lookup table can be constructed to be smooth and/or constrained in slope. The smoothness constraint is used to prevent artifacts along corners. The constraints to the slope can be selected empirically to determine the cutoff values (i.e. the predefined maximum value and the predefined minimum value) for the bins. The gain is advantageously selected in such a way that the gain does not exceed the ratio of the input to output quantization of the modified histogram equalization. E.g. if a compression of 12 bit to 8 bit is performed with the second lookup table, the gain should not exceed a factor of 16 to avoid gaps in the output values. Furthermore, the slope constraint can avoid signal amplification beyond information gain and also prevents the mapping of too many bins to one output bin as well as the mapping of too many grey levels to too few values.

The modified histogram equalization is thus used to overcome the limitations of an unmodified/standard histogram equalization. The modified histogram equalization can be used for tone-mapping the brightness levels of the first image from a logarithmic space to an e.g. 8 bit value range. The mapping can be implemented—as described above—by using the second lookup table.

Similar to the first lookup table, the second lookup table preferably is created only once and can then be used to transform all pixels of an image. Thereby, a further reduction of the required processing power can be realized.

According to a further embodiment, the camera is a red/clear imager (RCCC imager), wherein the input image and the first image comprise red and grey pixels, wherein a second image is extracted from the first image, wherein the second image comprises the red pixels of the first image; and a third image is generated from the first image, wherein the red pixels of the first image are replaced by interpolating the values of neighboring grey pixels of the first image.

The camera can generate one quarter of the pixels of the input image as red pixels. The remaining pixels can be grey pixels (i.e. clear pixels).

In other words, the first image can be subjected to red extraction and/or demosaicing and interpolation. The interpolation of the red pixels can use 2 or 4 neighboring grey/clear pixels (the expressions "grey" and "clear" as well as "g" and "c" in formulas, correspond to each other). The interpolation can use those two neighboring pixels with the lowest gradient in between. The second image can have a quarter of the resolution of the first image.

In a further embodiment the interpolated values of the third image are subtracted from the corresponding values of the red pixels of the second image, thereby generating a fourth image. Hence, the logarithm of the relation of red to clear values ($a*\log(r/c)$) is calculated. Since the second and the third image are preferably transformed using logarithmic functions, the fourth image (i.e., $\log(r/c)$) can be efficiently calculated as a subtraction ($\log(r)-\log(c)$).

In a further embodiment the fourth image is mapped to a red to clear ratio image using a linear mapping, wherein the value range of each pixel in the red to clear ratio image is smaller than in the fourth image. Preferably, the red to clear ratio image has 8 bits per pixel.

In accordance with a further embodiment the third image is mapped to a grey image using the second lookup table, wherein the value range of each pixel in the grey image is smaller than in the third image. In other words, the modified histogram equalization represented by the second lookup table is used to transform the third image into the grey image.

Preferably the grey image comprises of 8 bits per pixel. As the mapping to the grey image can be done using the second lookup table, it can be performed with low computing requirements. The grey image, the first image, the second image, and/or the third image can be black and white or greyscale or red pixel images.

The grey image and the red to clear ratio image are preferably made available for further processing, particularly for the use in automotive machine vision applications. Having an 8 bit representation of the color ratio and the grey values can be advantageous in terms of memory bandwidth for subsequent calculation steps.

In the following, calculations are described that can be executed to provide a color image (R image) from the grey image and/or the red to clear ratio image.

In an embodiment, a white balance factor is calculated based on the function $$w_b = 2^{\log 2\ f - \frac{1}{ap}\Sigma\left(a\log_2 \frac{r}{g}\right)},\qquad \text{Eq. 3}$$

wherein $w_b$ is the white balance factor, f is ⅓, p is a pixel count of the first image, r is the value of a red pixel of the first image, g is the value of a grey (i.e. clear) pixel of the first image. As an alternative, the a*log$_2$(r/g) ratio values from the fourth image can be summed up, when they are calculated in order to facilitate an easier calculation of the white balance factor.

Preferably the resolution of the red to clear ratio image is interpolated to be equal to the resolution of the grey image, wherein an interpolated red to clear ratio image is generated. To each pixel of the interpolated red to clear ratio image, a value $$y=a*ld(g_{new})+b \qquad \text{Eq. 4}$$

can be added, thus creating a first modified interpolated red image. In an advantageous implementation, this value is generated by transforming the grey image using the first lookup table. $g_{new}$ is the value of a grey pixel of the grey image.

Further preferably, a logarithm of the white balance factor, i.e.

$$y=a*ld(w_b) \qquad \text{Eq. 5}$$

is added to each pixel value of the first modified interpolated red image, thereby creating a second modified interpolated red image.

The white balance factor can also be outputted to allow interpreting the red to clear ratio image correctly.

According to an embodiment, a third lookup table is created, which represents the function $$y = 2^{\frac{x-b}{a}}, \qquad \text{Eq. 6}$$

wherein the third lookup table is used to create a red image from the second modified red image. Thus, the red image can be generated by reversing the previous logarithmic functions.

The second modified interpolated red image can represent the function $$y = a*ld\left(\frac{r_{old}}{c_{old}}c_{new}*w_b\right)+b,. \qquad \text{Eq. 7}$$

Thus a reversal of the previous logarithmic functions can represent the red image incorporating the mapping of the grey values of the input image. The red image can be expressed as $$r_{new} = \frac{r_{old}}{c_{old}}*c_{new}*w_b, \qquad \text{Eq. 8}$$

wherein $r_{old}$ represents a value of a red pixel of a re-linearized input image (i.e. after the inverse function has been applied to the input image). $c_{old}$ represents the grey value of the re-linearized input image. $c_{new}$ is a value of a pixel of the grey image (i.e. corresponds to $g_{new}$). $r_{new}$ is a value of a pixel of the red image.

The steps described above, is/are advantageously executed based on the presented additions and subtractions.

Further preferably, one third of each pixel value of the red image is subtracted from each corresponding pixel value of the grey image and the resulting pixel values can be multiplied by 1.5 and are equally distributed to a blue color channel and a green color channel. Finally, the red image, the blue color channel, and the green color channel can be combined to create a color image.

As mentioned above, the input image can comprise fewer bits per pixel than the first image. For example, the input image can comprise 12 bits per pixel, whereas the first image comprises 15 bits per pixel. The grey image can use fewer bits per pixel than the input image. Particularly, the grey image and/or the red to clear ratio image can use 8 bits per pixel.

The first lookup table and the third lookup table can be generated only once and be used for a plurality of images, if it is assumed that the camera transition curve is fixed over time. All processing steps could also be combined into one function only.

The present invention further relates to a camera system comprising a camera and a processing unit. The camera system is adapted to: generate an input image with the camera, the input image comprising a plurality of pixels, each pixel having an initial pixel value, wherein the initial pixel values are generated using a camera transition curve; generate a first lookup table representing a combination of an inverse function and a re-compression function, the first lookup table having input values and output values, wherein each input value is linked to one, preferably to exactly one, output value, the inverse function is the inverse of the camera transition curve, the re-compression function is preferably a smooth and continuous function preferably having a slope at each input value which is greater than (or equal to) a corresponding slope of the camera transition curve, and wherein the first lookup table is generated such that the inverse function precedes the re-compression function; and generate a first image by converting the initial pixel values preferably using the first lookup table.

The generation of the first lookup table and the first image can be achieved by the processing unit.

Finally, the present invention also relates to a vehicle with the camera system, wherein output data of the camera system, preferably the grey image, the modified histogram, the red to clear ratio image and/or the color image, are used for machine vision applications.

The description concerning the inventive method is applicable mutatis mutandis to the inventive camera system and the inventive vehicle. This is particularly true in view of advantages and the described embodiments.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will exemplarily be explained in more detail in the following with reference to preferred embodiments and to the accompanying drawings in which are shown.

DETAILED DESCRIPTION

Figure 1:
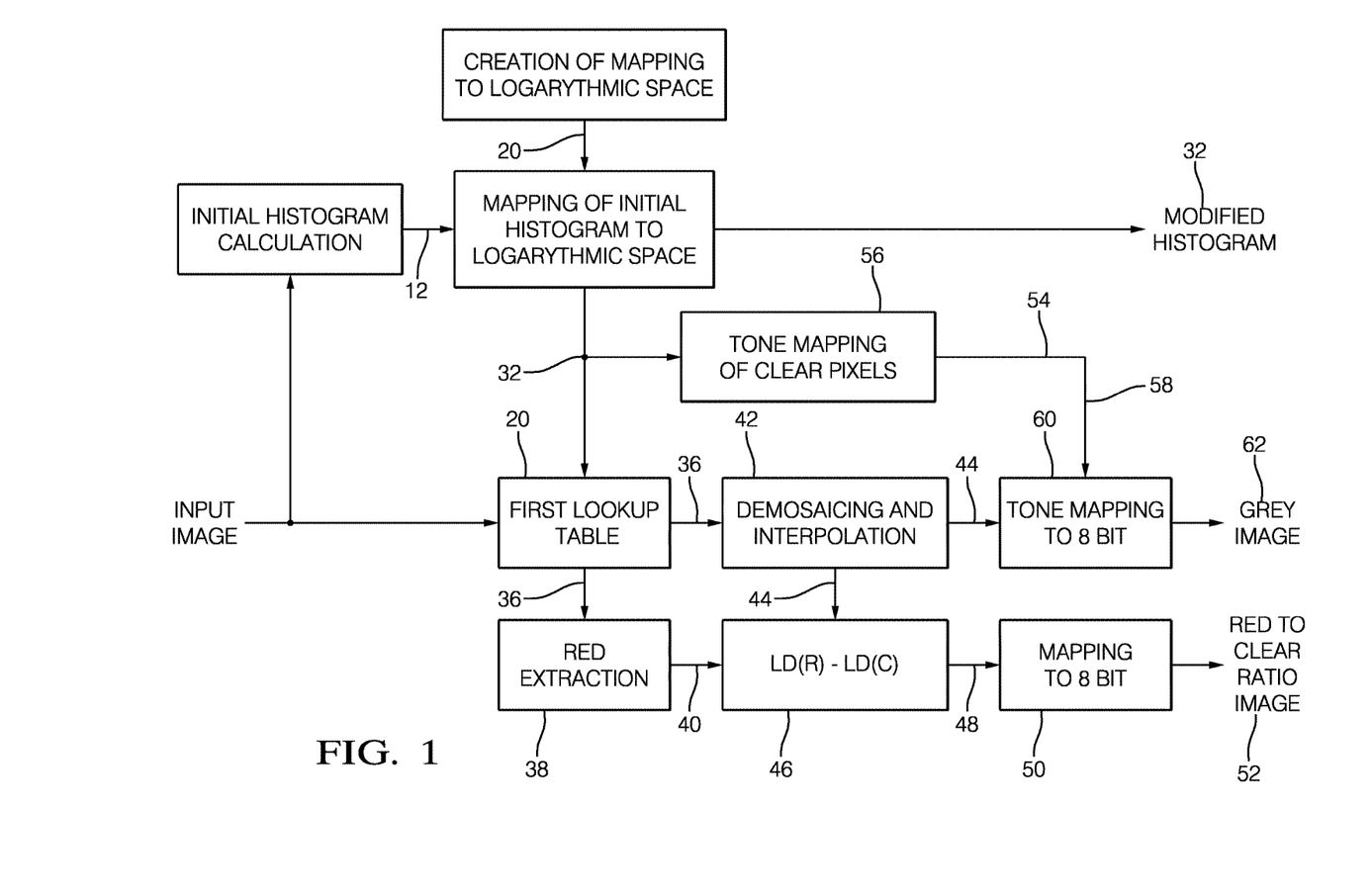
FIG. 1 is a block diagram showing a method in accordance with the present invention.

The method depicted in FIG. 1 starts with the acquisition of an input image 10 by a camera (not shown). The camera is mounted on a vehicle, wherein the input image shows a view through the windshield of the vehicle. The camera is a RCCC imager, thus, the input image comprises red and grey pixels. From the input image 10 an initial histogram 12 is calculated in box 14.

Figure 4:
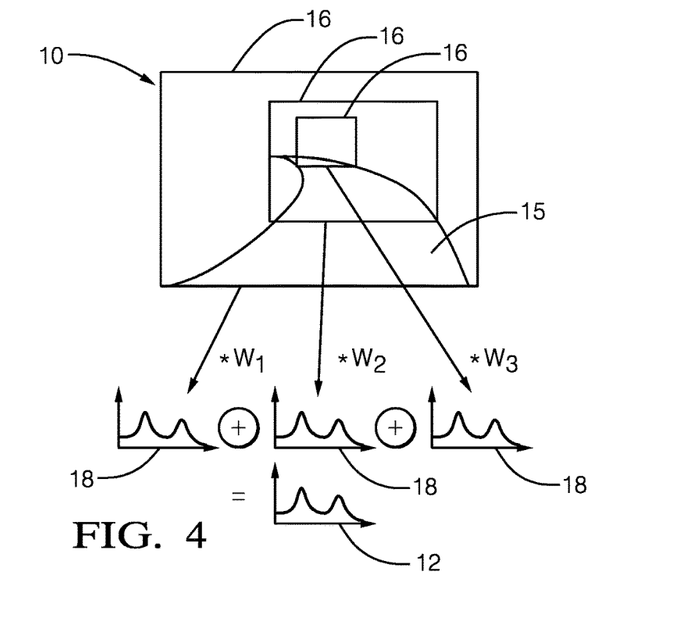
FIG. 4 is a camera image showing the definition of image regions along a driving path.

The calculation of the initial histogram 12 is shown in more detail in FIG. 4. FIG. 4 shows a road 15 which is depicted in the input image 10. From the input image 10 three different regions 16 are used to calculate respective sub-histograms 18. One region 16 comprises the whole of the input image 10, whereas the other regions 16 comprise only parts of the input image 10, which are aligned along the road 15. For a histogram of the whole of the input image 10, a histogram embedded in the imager data from the camera can be used.

Each sub-histogram is weighted with a factor $w_1$, $w_2$, $w_3$, respectively, wherein the initial histogram 12 is the weighted sum of the sub-histograms 18. As an example, all weights $w_1$, $w_2$, $w_3$ are equal.

Figure 3:
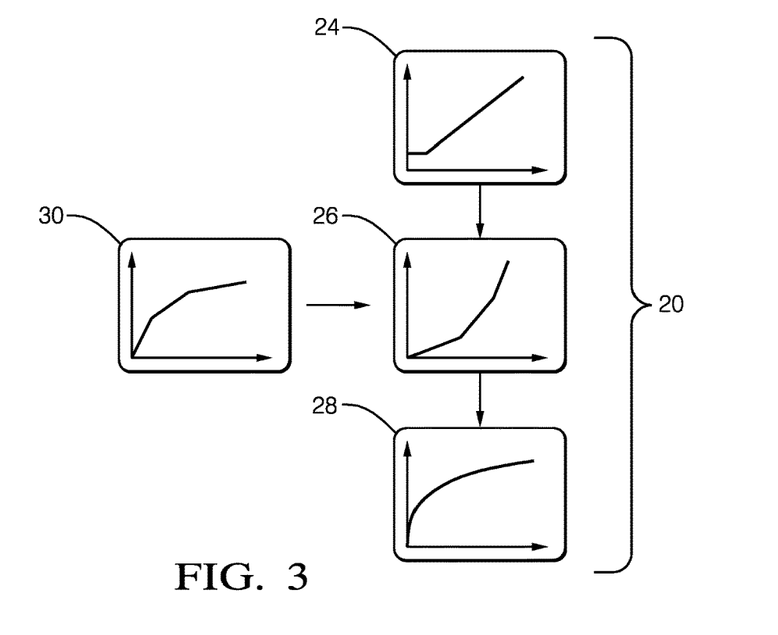
FIG. 3 is a block diagram depicting the generation of a first lookup table.

Coming back to FIG. 1, a first lookup table 20 is generated in box 22, wherein the first lookup table 20 represents a function that comprises three calculation steps, as is shown in more detail in FIG. 3.

The first calculation step is a clipping function 24 (FIG. 3) that maps all values below or equal to 1 to a value of 0. All other values remain the same.

The second calculation step is an inverse function 26 which represents the inverse of a camera transition curve 28. The camera transition curve 28 is an attribute of the used camera.

The third calculation step is a logarithmic re-compression function 30. The re-compression function 30 is a smooth and continuous function and has a slope at each input value which is greater than a corresponding slope of the camera transition curve 28.

The first lookup table 20 is calculated such that it represents a subsequent execution of the clipping function 24, the inverse function 26, and the re-compression function 30.

The input image 10 can use e.g. 12 bits per pixel; consequently, the first lookup table 20 can comprise output values for 4096 input values. The mapping created by the first lookup table 20 maps the 12 bit data of the input image 10 to data using 15 bits per pixel.

Now referring to FIG. 1 again, the first lookup table 20 is used to map the initial histogram 12 to a modified histogram 32 (box 34). In box 20 the input image 10 is converted into a first image 36 using the first lookup table 20. The red pixels are extracted from the first image 36 thereby forming a second image 40 in box 38.

In box 42 a demosaicing and interpolation of the first image 36 takes place, wherein the red pixels of the first image 36 are replaced by interpolating the values of two neighboring grey pixels of the first image 36 using those two neighboring pixels with the lowest gradient in between. This interpolation results in a third image 44.

In box 46 the interpolated values of the third image 44 are subtracted from the corresponding values of the red pixels of the second image 40. Thereby, a fourth image 48 is generated. In box 50 the fourth image 48 is linearly mapped to 8 bit resulting in a red to clear ratio image 52.

In box 56 the modified histogram 32 is transformed to a reduced histogram 54 containing only 64 bins. The transformation of the modified histogram 32 to the reduced histogram 54 comprises an alteration of the bin counts of the modified histogram 32, a convolution of the modified histogram 32 with a low-pass filter and the generation of the reduced histogram 54 as a cumulative histogram of the modified histogram 32 (after the alteration and the convolution). Based on the reduced histogram 54, a second lookup table 58 is generated. The second lookup table 58 applies a modified histogram equalization thereby performing a mapping of data to 8 bits per pixel.

In box 60 the third image 44 is mapped to 8 bit using the second lookup table 58, thereby creating a grey image 62 (i.e., an LDR image—Low Dynamic Range image).

The method shown in FIG. 1 thus yields a grey image 62, a red to clear ratio image 52 and a modified histogram 32, which can be used for further processing in e.g. machine vision applications.

Figure 2:
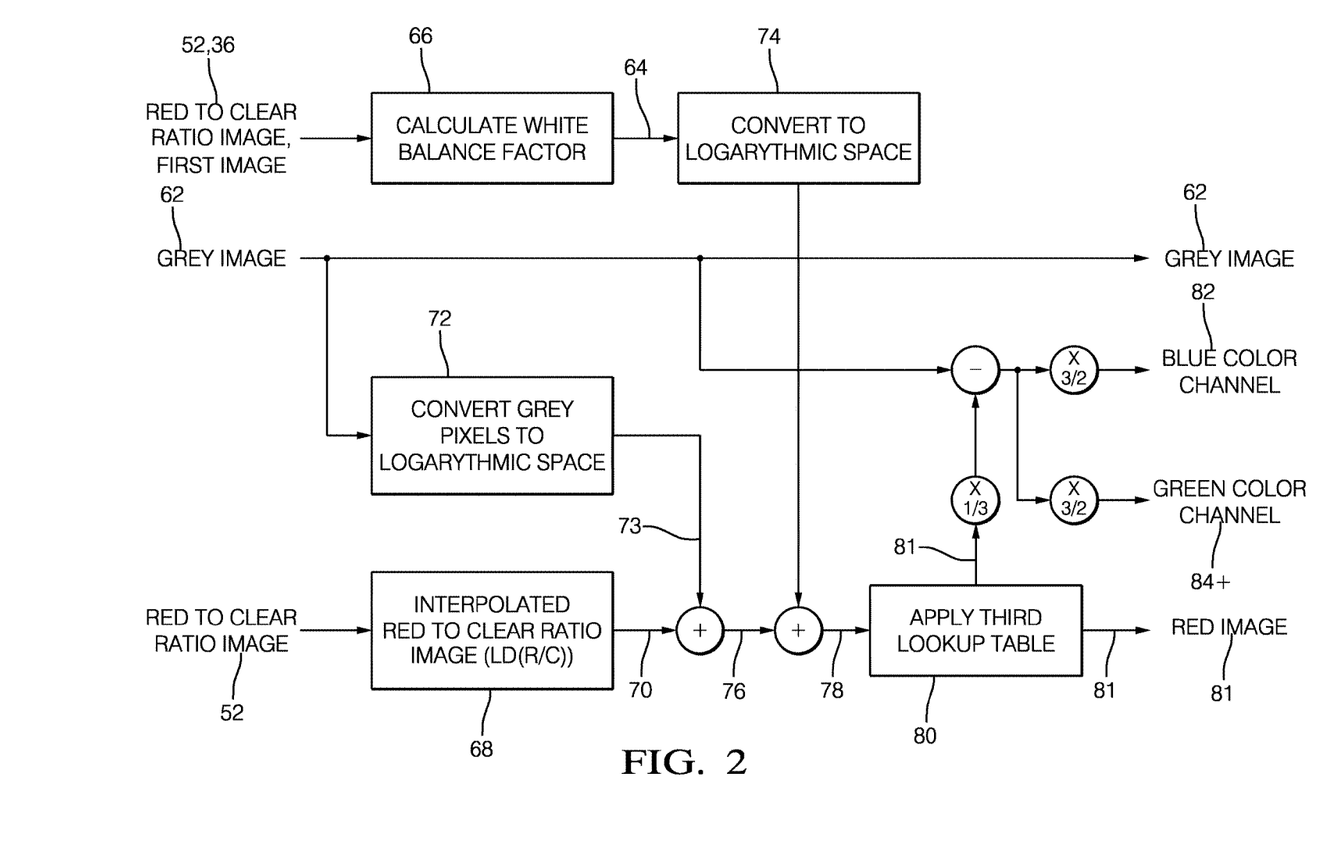
FIG. 2 is a block diagram showing the reconstruction of a color image.

An exemplary further processing is shown in FIG. 2, wherein a color image is computed.

From the red to clear ratio contained in the red to clear ratio image 52 and/or from the first image 36, a white balance factor 64 is calculated in box 66 (FIG. 2), wherein the function $$w_b = 2^{\log_2 f - \frac{1}{ap}\Sigma(a\log_2 \frac{r}{g})} \qquad \text{Eq. 3}$$

as introduced above is used.

In box 68 the resolution of the red to clear ratio image 52 is interpolated to be equal to the resolution of the grey image 62, wherein an interpolated red to clear ratio image 70 is generated.

In box 72 the grey image 62 is mapped to a logarithmic space using the function $$y = a*ld(g_{new}) + b \qquad \text{Eq. 4.}$$

A resulting transformed grey image 73 is added to the interpolated red to clear ratio image 70, resulting in a first interpolated red image 76. A logarithmic value of the white balance factor 64 is added to each pixel value of the first interpolated red image 76, resulting in a second interpolated red image 78. The logarithmic value of the white balance factor 64 is calculated in box 74.

In box 80 a third lookup table is created which represents the function $$y = 2^{\frac{x-b}{a}}, \qquad \text{Eq. 6}$$

which is used to create a red image 81 from the second modified interpolated red image 78.

One third of each pixel value of the red image 81 is subtracted from each corresponding pixel value of the grey image 62 and the resulting pixel values are equally distributed, i.e., multiplied by a factor of 1.5, and outputted as a blue color channel 82 and a green color channel 84. The red image 81, the blue color channel 82, and the green color channel 84 are then combined to create a color image (not shown).

Since e.g. the first lookup table 20 and the third lookup table can be re-used for all images acquired with a certain camera, the lookup tables only have to be created once. The second lookup table 58 can be created histogram based and requires no modification of the image before. This results in a severe reduction of the required computational power to execute the described method.

Furthermore, due to the used logarithmic space values many complicated multiplication or division operations can be replaced with simpler additions or subtractions, thus creating an efficient method for processing high dynamic range data from a nonlinear camera.

While this invention has been described in terms of the preferred embodiments thereof, it is not intended to be so limited, but rather only to the extent set forth in the claims that follow.

We claim:

1. A method for processing High Dynamic Range (HDR) data from a nonlinear camera, the method comprising:
   generating an input image with the camera, the input image comprising a plurality of pixels, each pixel having an initial pixel value, wherein the initial pixel values are generated using a camera transition curve;
   generating a first lookup table representing a combination of an inverse function and a re-compression function, the first lookup table having input values and output values, wherein
   each input value is linked to one output value,
   the inverse function is the inverse of the camera transition curve,
   the re-compression function is a smooth and continuous function having a slope at each input value which is greater than or equal to a corresponding slope of the camera transition curve,
   the first lookup table is generated such that the inverse function precedes the re-compression function; and
   generating a first image by converting the initial pixel values using the first lookup table,
   wherein the camera is a red/clear imager (RCCC imager), wherein one of the input image and the first image comprise red and grey pixels, wherein a second image is extracted from the first image, wherein the second image comprises the red pixels of the first image, and a third image is generated from the first image, wherein the red pixels of the first image are replaced by interpolating the values of neighboring grey pixels of the first image, and
   a white balance factor is calculated based on the function $$w_b = 2^{\log 2 \; f - \frac{1}{ap}\Sigma\left(a\log_2 \frac{r}{g}\right)},$$

wherein wb is the white balance factor, f is ⅓, p is a pixel count, r is the value of a red pixel of the first image, and g is the value of a grey pixel of the first image.

2. The method in accordance with claim 1, wherein the re-compression function is a logarithmic function $$y=a*ld(x)+b,$$

wherein a and b are selected such that $$d/dx \; a*ld(x)+b \leq d/dx \; \text{camera\_transition\_curve}(x),$$

wherein a and b are coefficients, x is an initial pixel value, and y is an output value.

3. The method in accordance with claim 1, wherein the first lookup table also represents a clipping function which maps all input values below or equal to one or all input values below or equal to a predefined threshold value to a value of zero, wherein the clipping function precedes the inverse function.

4. The method in accordance with claim 1, wherein an initial histogram of the input image is calculated and the initial histogram is transformed into a modified histogram using the first lookup table.

5. The method in accordance with claim 4, wherein the initial histogram is calculated as a weighted sum of sub-histograms of several regions of the input image, wherein each sub-histogram is preferably given equal weight.

6. The method in accordance with claim 5, wherein the modified histogram is transformed to a reduced histogram comprising of fewer bins than the modified histogram and a second lookup table is generated, which represents a modified histogram equalization based on the reduced histogram.

7. The method in accordance with claim 6, wherein the modified histogram equalization comprises altering the bin counts of the modified histogram such that all bin counts are between a predefined maximum value and a predefined minimum value, and wherein the modified histogram equalization further comprises convolving the modified histogram with a low-pass filter, preferably after the alteration of the bin counts of the modified histogram.

8. The method in accordance with claim 6, wherein the modified histogram equalization comprises generating the reduced histogram as a cumulative histogram from the modified histogram, preferably after a convolution, wherein the reduced histogram comprises fewer bins than the modified histogram and wherein a histogram equalization using the reduced histogram is mapped in the second lookup table.

9. The method in accordance with claim 1, wherein the interpolated values of the third image are subtracted from the corresponding values of the red pixels of the second image thereby generating a fourth image and the fourth image is mapped to a red to clear ratio image using a linear mapping, wherein the value range of each pixel in the red to clear ratio image is smaller than in the fourth image.

10. The method in accordance with claim 1, wherein the third image is mapped to a grey image using a second lookup table, wherein the value range of each pixel in the grey image is smaller than in the third image.

11. The method in accordance with claim 1, wherein the resolution of the red to clear ratio image is interpolated to be equal to the resolution of the grey image, wherein an interpolated red to clear ratio image is generated and wherein to each pixel of the interpolated red to clear ratio image a value y=a*ld(gnew)+b is added, with gnew being the value of a grey pixel of the grey image, thereby creating a first modified interpolated red image, wherein the value y is generated by transforming the grey image using the first lookup table, and wherein a logarithm of the white balance factor is added to each pixel value of the first modified interpolated red image, thereby creating a second modified interpolated red image,
   a third lookup table is created, which represents the function y=2^((x−b)/a) wherein the third lookup table is used to create a red image from the second modified red image, one third of each pixel value of the red image is subtracted from each corresponding pixel value of the grey image and the resulting pixel values are equally distributed to a blue color channel and a green color channel and the red image, the blue color channel and the green color channel are combined to create a color image.

12. A method for processing High Dynamic Range (HDR) data from a nonlinear camera, the method comprising:
generating an input image with the camera, the input image comprising a plurality of pixels, each pixel having an initial pixel value, wherein the initial pixel values are generated using a camera transition curve;
generating a first lookup table representing a combination of an inverse function and a re-compression function, the first lookup table having input values and output values, wherein
each input value is linked to one output value,
the inverse function is the inverse of the camera transition curve,
the re-compression function is a smooth and continuous function having a slope at each input value which is greater than or equal to a corresponding slope of the camera transition curve,
the first lookup table is generated such that the inverse function precedes the re-compression function; and
generating a first image by converting the initial pixel values using the first lookup table,
wherein the camera is a red/clear imager (RCCC imager), wherein one of the input image and the first image comprise red and grey pixels, wherein a second image is extracted from the first image, wherein the second image comprises the red pixels of the first image, and a third image is generated from the first image, wherein the red pixels of the first image are replaced by interpolating the values of neighboring grey pixels of the first image, and
wherein the interpolated values of the third image are subtracted from the corresponding values of the red pixels of the second image thereby generating a fourth image and the fourth image is mapped to a red to clear ratio image using a linear mapping, wherein the value range of each pixel in the red to clear ratio image is smaller than in the fourth image.

13. A method for processing High Dynamic Range (HDR) data from a nonlinear camera, the method comprising:
generating an input image with the camera, the input image comprising a plurality of pixels, each pixel having an initial pixel value, wherein the initial pixel values are generated using a camera transition curve;
generating a first lookup table representing a combination of an inverse function and a re-compression function, the first lookup table having input values and output values, wherein
each input value is linked to one output value,
the inverse function is the inverse of the camera transition curve,
the re-compression function is a smooth and continuous function having a slope at each input value which is greater than or equal to a corresponding slope of the camera transition curve,
the first lookup table is generated such that the inverse function precedes the re-compression function; and
generating a first image by converting the initial pixel values using the first lookup table,
wherein the camera is a red/clear imager (RCCC imager), wherein one of the input image and the first image comprise red and grey pixels, wherein a second image is extracted from the first image, wherein the second image comprises the red pixels of the first image, and a third image is generated from the first image, wherein the red pixels of the first image are replaced by interpolating the values of neighboring grey pixels of the first image, and
wherein the third image is mapped to a grey image using a second lookup table, wherein the value range of each pixel in the grey image is smaller than in the third image.

* * * * *